United States Patent
Weisbrod et al.

(10) Patent No.: US 11,523,438 B2
(45) Date of Patent: *Dec. 6, 2022

(54) DETERMINING DEVICE LOCATIONS BASED ON RANDOM ACCESS CHANNEL SIGNALING

(71) Applicant: Verizon Patent and Licensing Inc., Basking Ridge, NJ (US)

(72) Inventors: Fred Weisbrod, Renton, WA (US); Corey J. Christopherson, Bainbridge Island, WA (US); Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,916

(22) Filed: Aug. 31, 2020

(65) Prior Publication Data

US 2020/0396773 A1 Dec. 17, 2020

Related U.S. Application Data

(63) Continuation of application No. 16/146,544, filed on Sep. 28, 2018, now Pat. No. 10,798,745.

(51) Int. Cl.
*H04W 4/00* (2018.01)
*H04W 74/08* (2009.01)
*H04W 56/00* (2009.01)
*H04W 76/27* (2018.01)

(52) U.S. Cl.
CPC ..... *H04W 74/0833* (2013.01); *H04W 56/001* (2013.01); *H04W 76/27* (2018.02); *H04W 56/003* (2013.01)

(58) Field of Classification Search
CPC ............ H04W 74/0833; H04W 76/27; H04W 56/001; H04W 56/003
USPC ........................................................ 370/329
See application file for complete search history.

(56) References Cited

U.S. PATENT DOCUMENTS

| | | | |
|---|---|---|---|
| 8,983,517 B2 * | 3/2015 | Jiang | H04W 72/0446 455/517 |
| 9,426,826 B1 | 8/2016 | Oroskar et al. | |
| 10,798,745 B2 * | 10/2020 | Weisbrod | H04W 76/27 |
| 2009/0238126 A1 | 9/2009 | Sato et al. | |
| 2009/0316638 A1 * | 12/2009 | Yi | H04W 24/08 370/329 |
| 2010/0111035 A1 * | 5/2010 | Eskicioglu | H04W 36/04 370/331 |
| 2012/0257569 A1 * | 10/2012 | Jang | H04W 74/0833 370/328 |

(Continued)

FOREIGN PATENT DOCUMENTS

CN 103687001 A * 3/2014

*Primary Examiner* — Maharishi V Khirodhar

(57) ABSTRACT

A user equipment (UE) device may determine its location with a high degree of precision, beyond the capability of other current methodologies. Specifically, a UE device may obtain High Precision (HIP) coordinates of its location based on Random Access Channel (RACH) messages that the UE device exchanges with multiple wireless stations. Using RACH messages to obtain HIP coordinates imposes little communication overhead or computational burden on the UE device and the network.

20 Claims, 13 Drawing Sheets

(56) References Cited

U.S. PATENT DOCUMENTS

| | | | |
|---|---|---|---|
| 2013/0301541 A1* | 11/2013 | Mukherjee | H04W 74/0833 370/329 |
| 2014/0226621 A1* | 8/2014 | Choi | H04W 36/0061 370/331 |
| 2015/0326995 A1 | 11/2015 | Li et al. | |
| 2016/0081122 A1* | 3/2016 | Tang | H04W 72/0413 370/329 |
| 2016/0192278 A1* | 6/2016 | Ji | H04W 48/20 370/329 |
| 2017/0034767 A1 | 2/2017 | Griot et al. | |
| 2017/0331670 A1 | 11/2017 | Parkvall et al. | |
| 2018/0160448 A1 | 6/2018 | Blankenship et al. | |
| 2018/0317263 A1* | 11/2018 | Ishii | H04W 74/0833 |
| 2018/0324552 A1* | 11/2018 | Kumar | H04W 4/027 |
| 2018/0324594 A1 | 11/2018 | Chen et al. | |
| 2018/0368126 A1* | 12/2018 | Islam | H04L 5/1469 |
| 2019/0028905 A1 | 1/2019 | Veeramallu et al. | |
| 2019/0082408 A1 | 3/2019 | Kim et al. | |
| 2019/0149310 A1 | 5/2019 | Liao et al. | |
| 2019/0174480 A1 | 6/2019 | Wong et al. | |
| 2019/0254007 A1 | 8/2019 | Gupta et al. | |
| 2021/0105821 A1* | 4/2021 | Niu | H04B 1/713 |
| 2021/0136713 A1* | 5/2021 | Yoon | H04W 74/00 |

\* cited by examiner

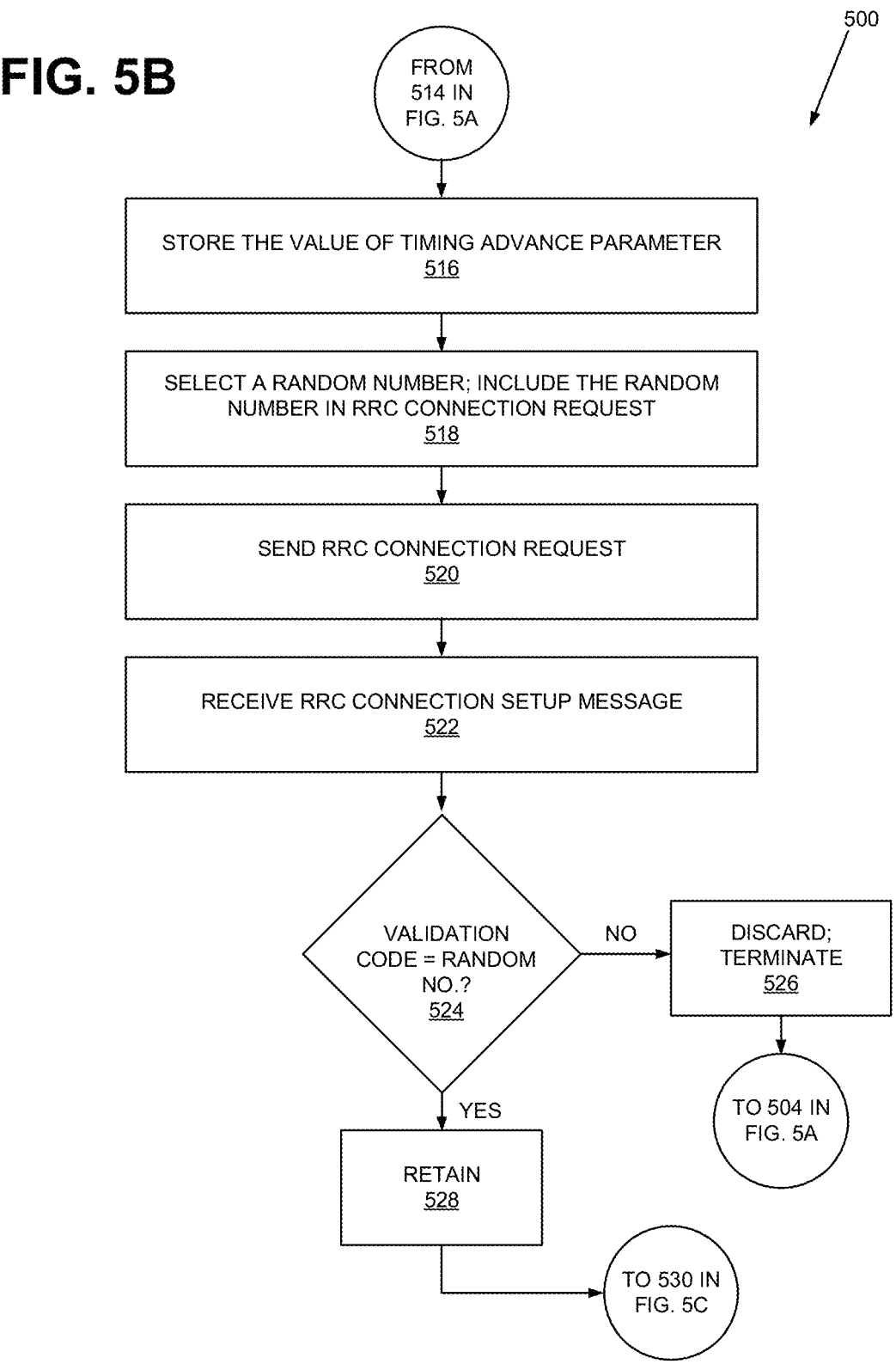

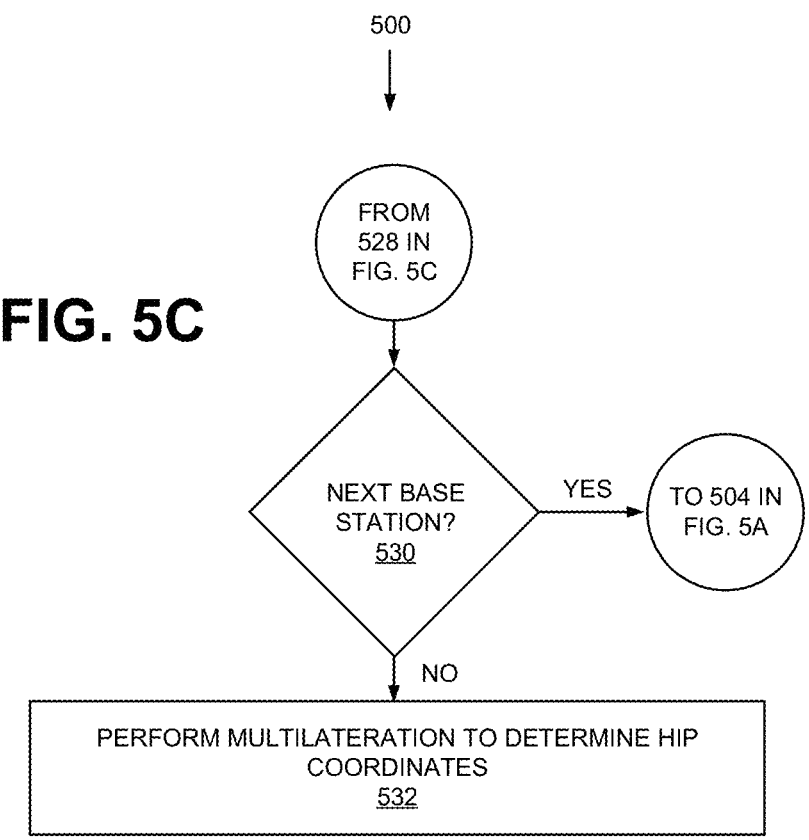

DETERMINING DEVICE LOCATIONS BASED ON RANDOM ACCESS CHANNEL SIGNALING

CROSS-REFERENCE TO RELATED APPLICATION

The present application is a continuation of, and claims priority to, U.S. application Ser. No. 16/146,544 filed Sep. 28, 2018, titled "Determining Device Locations based on Random Access Channel Signaling," the contents of which are incorporated by reference herein in their entirety.

BACKGROUND

User devices associated with a Long Term Evolution (LTE) network may have the capability to communicate via a Fifth Generation (5G) New Radio (NR) system. For example, an Evolved Universal Terrestrial Radio Access New Radio Dual Connectivity (EN-DC) device has the capability to exchange data with an LTE wireless station, as well as exchange data with a 5G next generation wireless station. 4G user devices, 5G NR devices, and other more advanced network-compatible devices may not only be capable of communicating with their networks at breakneck speeds, but may also leverage their networks to provide services unavailable in other networks.

BRIEF DESCRIPTION OF THE DRAWINGS

FIGS. 5A-5C illustrate an exemplary process for determining High Precision (HIP) coordinates of the UE device of FIG. 2 based on Random Access Channel (RACH) signaling according to one implementation;

DETAILED DESCRIPTION OF PREFERRED EMBODIMENTS

The following detailed description refers to the accompanying drawings. The same reference numbers in different drawings may identify the same or similar elements.

In implementations described herein, a user equipment (UE) device may determine its location with a high degree of precision, beyond the capability of other current methodologies. More specifically, the UE device may obtain High Precision (HIP) coordinates of its location in $4^{th}$ Generation (4G) networks, $5^{th}$ Generation (5G) networks, and/or other advanced networks based on Random Access Channel (RACH) messages that the UE device exchanges with three or more wireless stations. Because a UE device often exchanges RACH messages with wireless stations (e.g., when the UE device attempts to attach to a network or when the UE device is involved in a handoff), using RACH messages to obtain HIP coordinates imposes relatively little communication overhead or computational burden on the UE device and the network. In addition, a network does not need to commit large amounts of resources to provide HIP coordinates to UEs in the network.

For a UE device, the precision of its HIP coordinates may depend on the subcarrier spacing, a Fast Fourier Transform size of network transceivers, and the number of wireless stations with which the UE device performs a RACH procedure to determine the HIP coordinates. While the absolute precision of HIP coordinates may be limited by the precision of the wireless station coordinates, the HIP coordinates of UE device may still be precise relative to the locations of the wireless stations themselves and/or to HIP coordinates of other nearby UE devices. The relative precision of HIP coordinates may be in centimeter (cm) or smaller ranges. Given their accuracy and precision, HIP coordinates may be used for device navigation through intricate passageways (e.g., guiding an unmanned aerial vehicle (UAV), an autonomous vehicle, etc.), for locating an item (e.g., an item in a retail store), improved accuracy for emergency response, etc.

Figure 1:
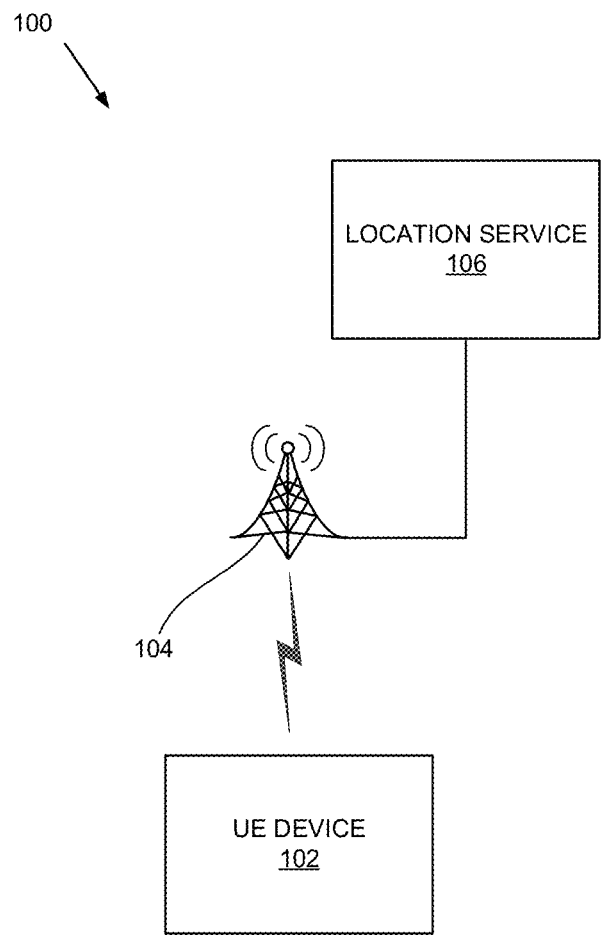
FIG. 1 illustrates concepts described herein.

FIG. 1 illustrates the concepts described herein. As shown, a system 100 may include a UE device 102, a wireless station 104, and location service platform 106. UE device 102 and wireless station 104 are described in greater detail with reference to FIG. 2.

As shown in FIG. 1, during normal operation, UE device 102 may monitor and receive broadcast messages from wireless station 104. The messages may include information that UE device 102 needs for attaching to a network (not shown). When UE device 102 is to obtain its HIP coordinates, UE device 102 may use the information to exchange a series of messages with wireless station 104. As described below, UE device 102 may use the messages to determine its HIP coordinates, rather than relying on a network-provided positioning service, such as a service provided by location service platform 106.

Figure 2:
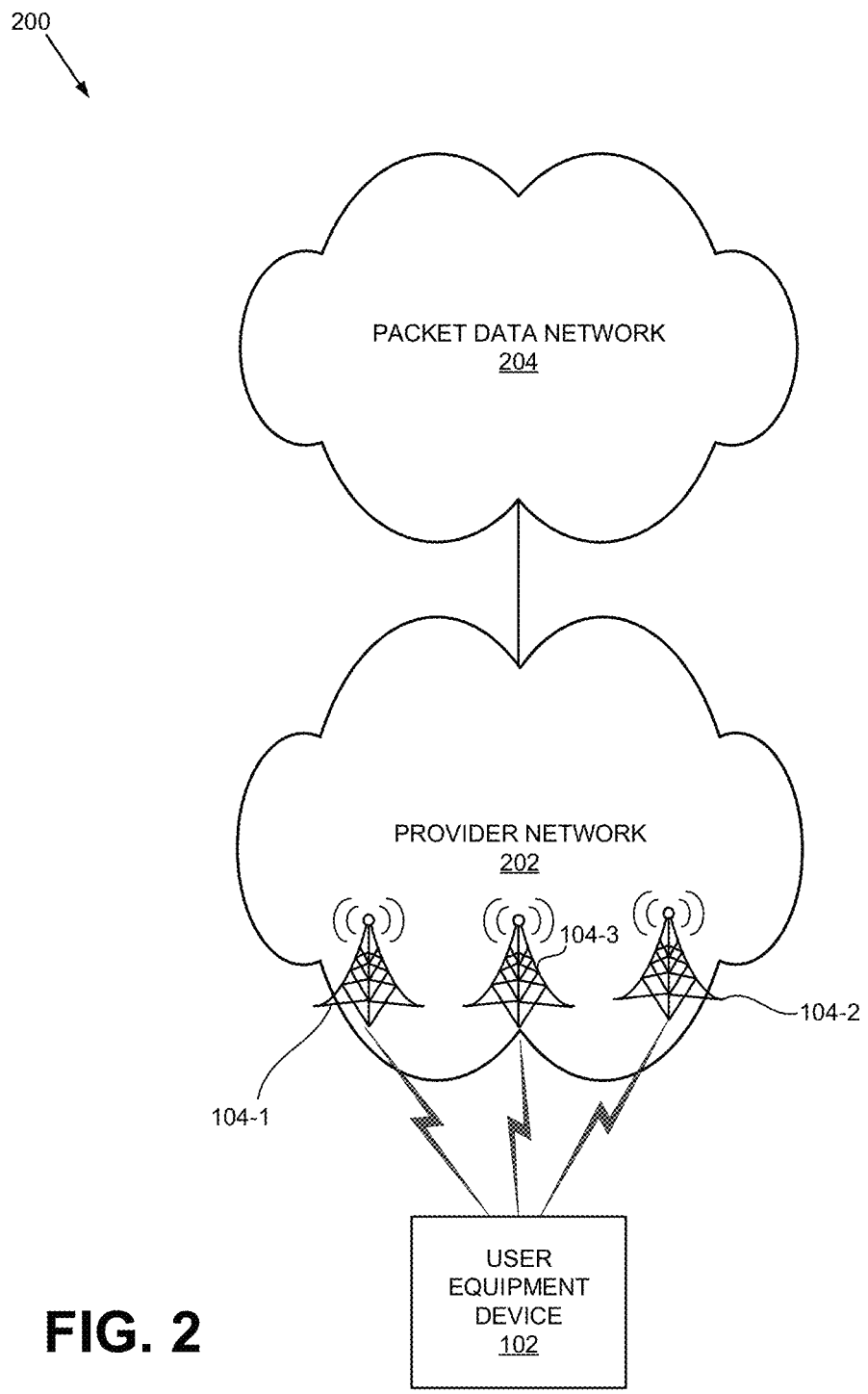
FIG. 2 illustrates an exemplary network environment in which the concepts described herein may be implemented.

FIG. 2 illustrates an exemplary network environment 200 in which the concepts described herein may be implemented. As shown, network environment 200 may include UE device 102, wireless stations 104-1, 104-2, and 104-3 (generically referred to herein as wireless station 104 and collectively as wireless stations 104), a provider network 202, and a packet data network 204. Depending on the implementation, network environment 200 may include networks other than those illustrated in FIG. 2. For simplicity, FIG. 2 does not show all components that may be included in network environment 200 (e.g., routers, bridges, wireless access point, additional UE devices, etc.).

UE device 102 may include a wireless communication device. Examples of UE device 102 includes: a smart phone; a tablet device; a wearable computer device (e.g., a smart watch); a global positioning system (GPS) device; a laptop computer; a media playing device; a portable gaming system; an Internet-of-Things (IoT) device. In some implementations, UE device 102 may correspond to a wireless MTC device that communicates with other devices over a machine-to-machine (M2M) interface, such as LTE-M or Category M1 (CAT-M1) devices and Narrow Band (NB)-IoT devices.

Provider network 202, which may be operated by a Mobile Network Operator (MNO), may include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., 4G network), a 5G network, an ad hoc network, a telephone network (e.g., the Public Switched Telephone Network (PSTN) or a cellular network), an intranet, or a combination of networks. Provider network 202 may allow the delivery of Internet Protocol (IP) services to UE device 102, and may interface with other networks, such as packet data network 204. In some implementations, provider network 202 may include one or more packet data networks.

Provider network 202 may include one or more wireless stations 104. Examples of wireless station 104 include evolved Node B (eNodeB) and 5G Node B (gNodeB). Wireless station 104 may be part of an access network (e.g., a radio access network, such as an evolved UMTS Terrestrial Radio Access Network (eUTRAN)). The access network may provide UE device 102 with wireless access to provider network 202.

Packet data network 204 may include a network that supports Internet Protocol (IP)-based communications. Packet data network 204 may include, for example, an IP Multimedia Subsystem (IMS) network, which may provide voice and multimedia services to UE device 102 based on Session Initiation Protocol (SIP).

In FIG. 2, when UE device 102 attempts to obtain its HIP coordinates, UE device 102 initiates, with each of wireless stations 104, a process for attaching to provider network 202. The process maybe referred to as the Random Access Channel (RACH) procedure. UE device 102 may perform the RACH procedure (or part of the RACH procedure, as described below) with each wireless station 104 to measure the distance from UE device 102 to the wireless station 104, and apply the technique of multilateration to the measured distances to obtain its HIP coordinates.

To apply multilateration, UE device 102 may use at least three wireless stations 104 with which UE device 102 can measure its distance thereto. If there are additional wireless stations 104, UE device 102 can obtain additional distance measurements, and use the additional distance measurements to increase the accuracy of the HIP coordinates.

Figure 3:
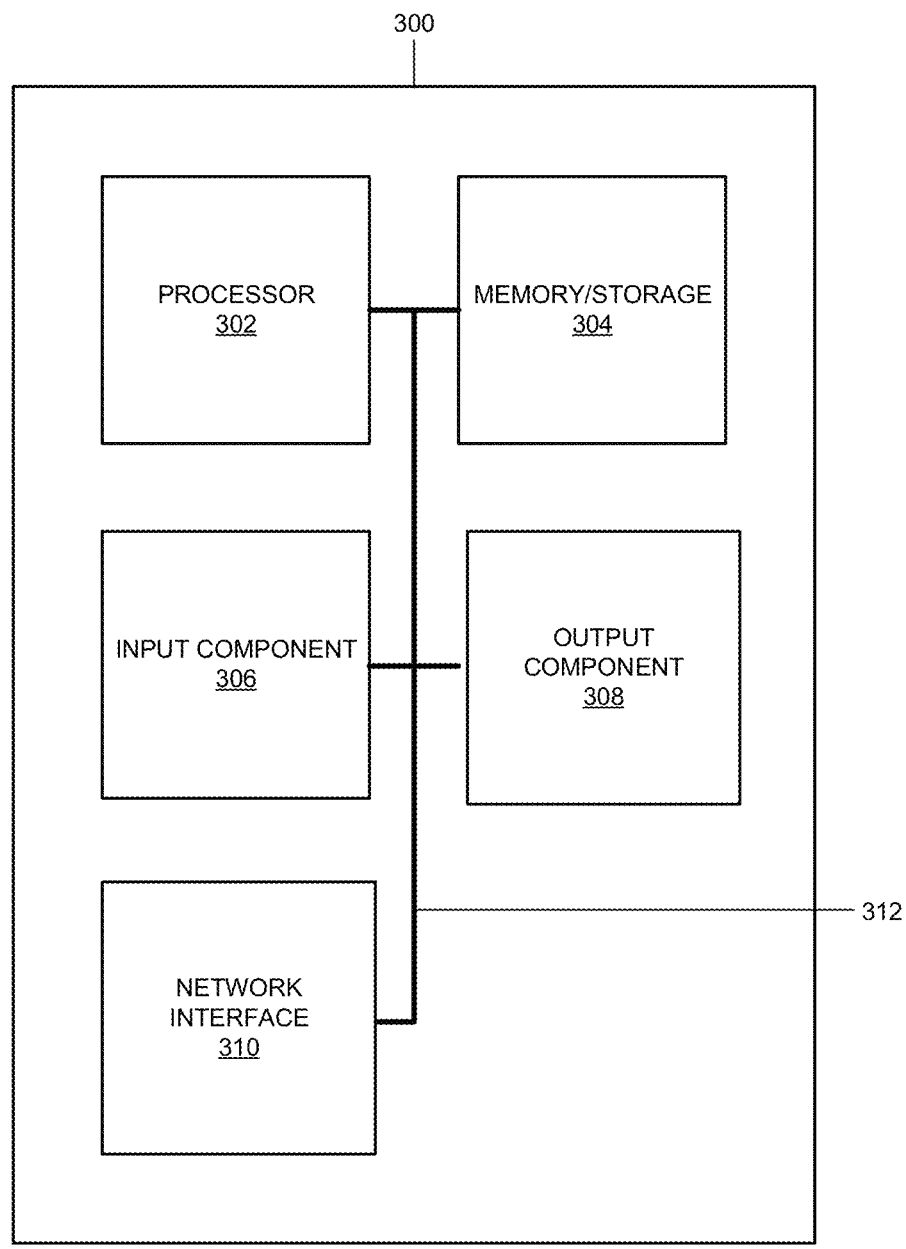
FIG. 3 illustrates exemplary components of network devices included in the network environment of FIG. 2.

FIG. 3 is a block diagram of exemplary components of a network device 300. Network device 300 may correspond to, or be included in, the devices and/or components of the networks depicted in FIG. 2 (e.g., UE device 102, wireless station 104, a router, a switch, a server, etc.). As shown, network device 300 may include a processor 302, memory/storage 304, input component 306, output component 308, network interface 310, and communication path 312. In different implementations, network device 300 may include additional, fewer, different, or a different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may receive input from a user and provide output to a user. Input/output components 306 and 308 may include, for example, a display screen, a keyboard, a mouse, a speaker, a microphone, a camera, a DVD reader, USB lines, and/or other types of components.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc. Network interface 310 may include a modem, an Ethernet interface to a LAN, and/or an interface/connection for connecting device 300 to other devices (e.g., a Bluetooth interface).

Communication path 312 may provide an interface (e.g., a bus) through which components of device 200 can communicate with one another.

In some implementations, network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein. In other implementations, the instructions may be hard coded. For example, when network device 300 is implemented as UE device 102, UE device 102 may obtain HIP coordinates based on RACH signaling.

Figure 4:
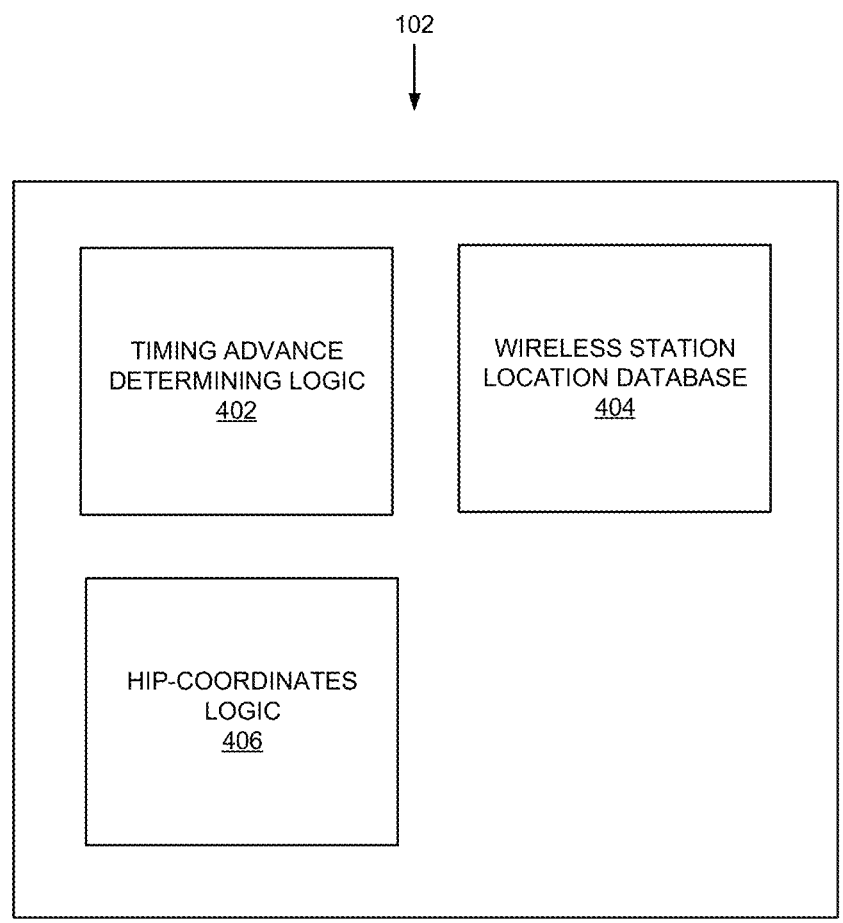
FIG. 4 shows exemplary functional components of the user equipment (UE) device of FIG. 2.

FIG. 4 illustrates exemplary functional components of UE device 102. As shown, UE device 102 may include Timing Advance Determining logic 402, a wireless station location database 404, and HIP-coordinates logic 406. Although UE device 102 may include other functional logic or components, they are not illustrated in FIG. 4 for simplicity. In other implementations, UE device 102 may include additional or different functional components than those illustrated in FIG. 4.

Timing Advance Determining logic 402 may include an application programming interface (API) for obtaining a value of the Timing Advance parameter provided by wireless station 104. More specifically, when HIP-coordinates logic 406 (or another component) calls Timing Advance Determining logic 402, logic 402 may detect whether UE device 102 is performing a RACH procedure. If UE device 102 is already engaged in such a process, Timing Advance Determining logic 402 may look for a Random Access Response (RAR) message from wireless station 104. If there is no ongoing RACH process, Timing Advance Determining logic 402 may cause UE device 102 to initiate a new RACH procedure. Thereafter, Timing Advance Determining logic 402 may wait for a RAR message from wireless station 104.

During a RACH procedure, when Timing Advance Determining logic detects an incoming RAR message from wireless station 104, logic 402 may extract the value of the Timing Advance parameter included the message. After verifying that the RAR message is intended for UE device 102, logic 402 may return the Timing Advance parameter value to HIP-coordinates logic 406. If logic 402 is unable to confirm that the RAR message is valid, logic 402 may re-initiate its attempt to obtain a Timing Advance parameter value from wireless station 104.

Wireless station location database 404 may include a table, list, or records of coordinates of wireless stations 104. When HIP-coordinates logic 406 needs coordinates of wireless station 104, HIP-coordinates logic 406 may query database 404 with a key, such as an identifier for wireless station (e.g., Physical layer Cell Identifier (PCI)). In response, database 404 may retrieve the coordinates corresponding to the wireless station 104 and provide the coordinates to logic 406. In some implementations, the information in database 404 may have been downloaded by HIP-coordinates logic 406 when UE device 102 registers with provider network 202 for communication services.

HIP-coordinates logic 406 may determine high precision coordinates of the current location of UE device 102. When HIP-coordinates logic 406 receives a request (e.g., from another application within UE device 102 or from an external device) to provide UE device coordinates, HIP-coordinates logic 406 may call Timing Advance Determining logic 402, to obtain a value of Timing Advance parameter from a wireless station 104. When Timing Advance Determining logic 402 provides at least three Timing Advance parameter values corresponding to different wireless stations 104, logic 406 may use each Timing Advance parameter value to calculate a distance between UE device 102 and the corresponding wireless station 104. Logic 406 may then use the calculated distances and coordinates of wireless stations 104 to determine UE device 102 coordinates, via multilateration. HIP-coordinates logic 406 may obtain the coordinates of wireless stations 104 from database 404.

Figure 5A:
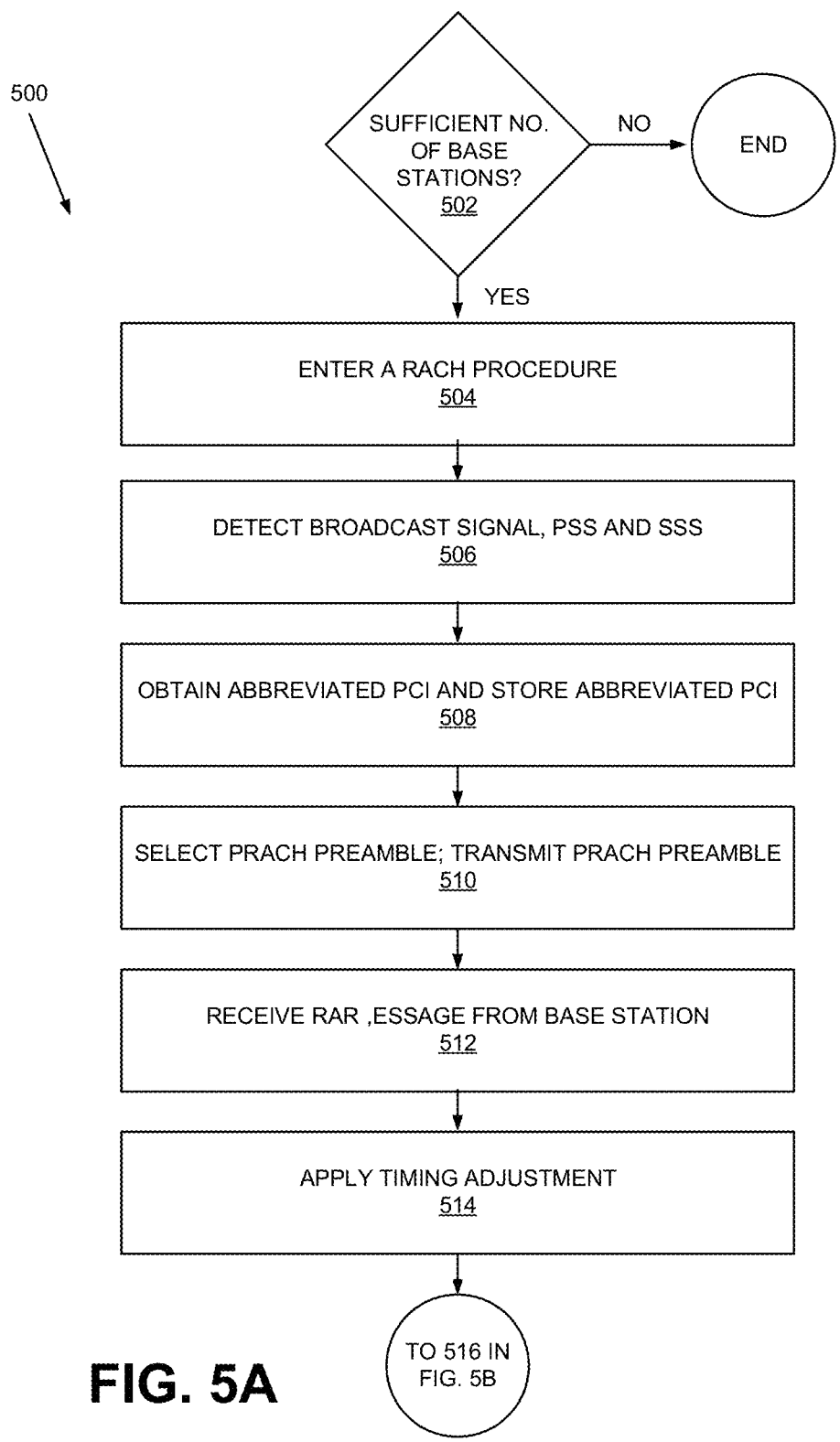
Figure 6:
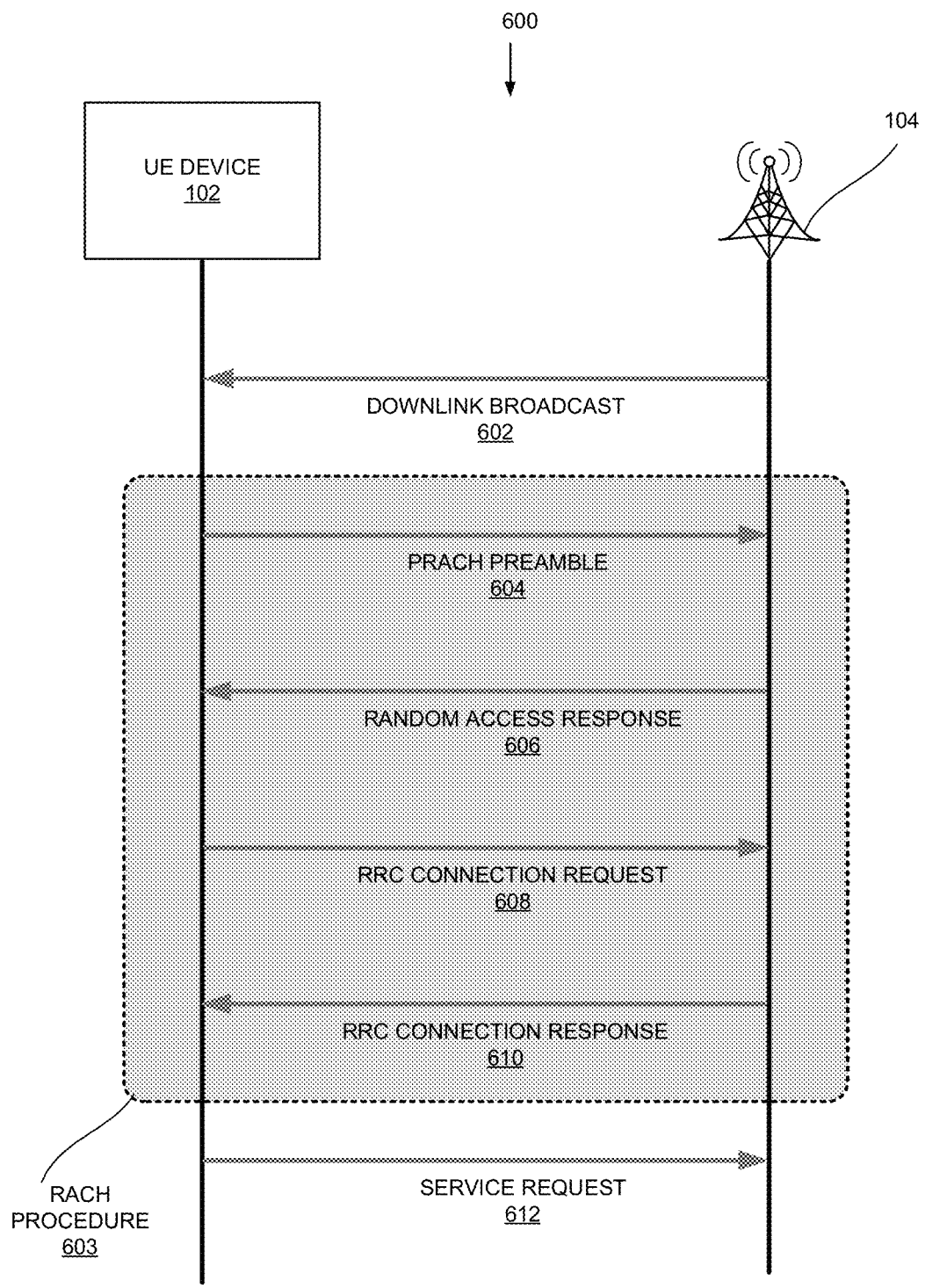
FIG. 6 is a messaging diagram illustrating an exemplary RACH procedure that involves the UE device and a wireless station of FIG. 2.

FIGS. 5A-5C illustrate an exemplary process 500 for determining HIP coordinates of UE device 102 based on RACH signaling according to one implementation. FIG. 6 is a messaging diagram illustrating an exemplary RACH procedure. According to one embodiment, process 500 may be performed by UE device 102.

Process 500 may start when UE device 102 decides that it needs to determine its HIP coordinates. For example, HIP-coordinates logic 406 may receive an API call from another program within UE device 102 to provide HIP coordinates of UE device 102. In another example, UE device 102 may receive a request from an external device to provide UE device coordinates.

Process 500 may include UE device 102 determining whether UE device 102 can detect a sufficient number of wireless stations 104 to perform multilateration (block 502). For example, UE device 102 may be able to detect at least three wireless stations, based on different wireless station signals within a given area. If there are not enough wireless stations 104 (block 502: NO), UE device 102 may terminate process 500. When UE device 102 terminates process 500, UE device 102 may provide, for example, an error message to a calling program or device. In another example, assume that UE device 102 initiated process 500 to support an application launched by a user. UE device 102 may indicate that UE device 102 is unable to determine its HIP coordinates via its user interface.

Process 500 may further include UE device 102 entering a RACH procedure (block 504), by either joining a RACH procedure currently in progress or by initiating a new RACH procedure.

Figure 7A:
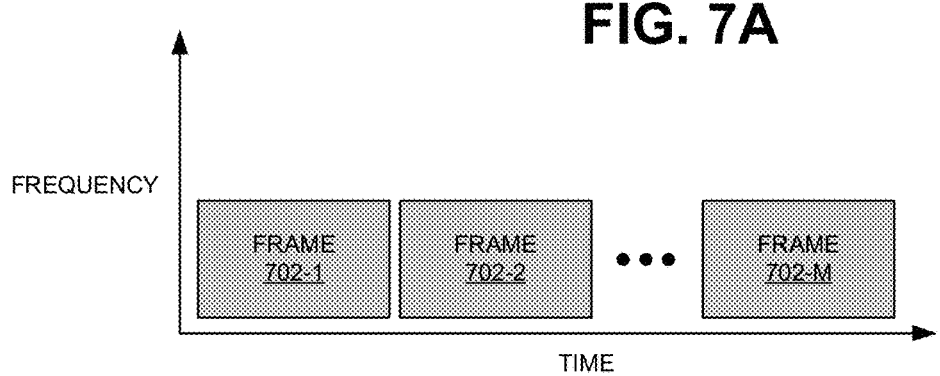
FIGS. 7A and 7B illustrate exemplary structures of messages between the UE device and the wireless station of FIG. 2.

As shown in FIG. 6, prior to the start of a RACH procedure 603, wireless station 104 sends a downlink broadcast signal 602. Broadcast signal 602 includes periodic radio frames, each of which occupies a particular range of frequencies and spans a particular time interval. FIG. 7A shows exemplary radio frames 702-1, 702-2 . . . 702-M (collectively radio frames 702 and generically radio frame 702) of broadcast signal 602.

Figure 7B:
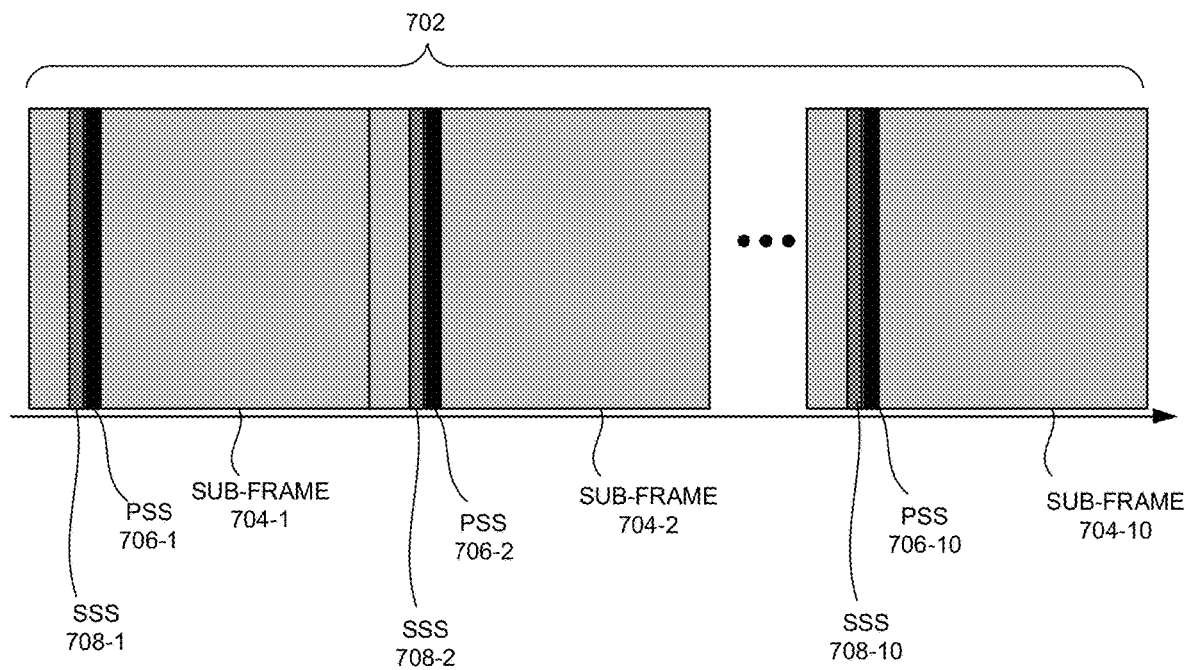

FIG. 7B illustrates an exemplary configuration of radio frame 702. Each radio frame 702 comprises sub-frames 704-1 through 704-10. Sub-frames 704 include information that UE device 102 needs for attaching to provider network 202 via wireless station 104. In particular, each of sub-frames 704 includes a Primary Synchronization Signal (PSS) 706 and a secondary Synchronization Signal (SSS) 708.

Returning to FIG. 5A, in response to broadcast signal 602, UE device 102 detects broadcast signal 602, PSS 706 and SSS 708 (block 506). UE device 102 can distinguish the beginning of each radio sub-frame 704, and thus, be able to synchronize to sub-frames 704.

PSS 706 and SSS 708 include information from which UE device 102 can derive an abbreviated Physical layer Cell Identity (PCI). The abbreviated PCI is a short-hand notation for an identifier for wireless station 104. After UE device 102 detects PSS 706 and SSS 708, UE device 102 derives the abbreviated PCI and stores the abbreviated PCI (block 508).

In addition to PSS 706 and SSS 708, sub-frame 704 includes information needed by UE device 102 to continue with RACH procedure 603. More specifically, sub-frame 704 includes a System Information Block-2 (SIB-2) that lists values of a number of parameters. For example, SIB-2 may include information that designates a set of symbol sequences. UE device 102 may select a particular sequence from the set and send, to wireless station 104, the sequence as part of a Physical Random Access Channel (PRACH) preamble.

The selection of the preamble by UE device 102 may depend on the size of a message that UE device 102 intends to send later. More specifically, if the size of a Radio Resource Control (RRC) connection request that UE device 102 wants to send later (see message 608 in FIG. 6) is greater than that specified in the SIB-2, UE device 102 would select the PRACH preamble from a set referred to as Group B defined by 4G standards. Otherwise, UE device 102 would selects the PRACH preamble from Group A.

After UE device 102 selects a PRACH preamble, UE device 102 transmits the PRACH preamble in accordance with a predetermined format and timing requirements specified by the SIB-2 (block 510 and PRACH preamble 604).

When wireless station 104 receives PRACH preamble 604, wireless station 104 calculates what is known as a Random Access (RA)-Radio Network Temporary Identifier (RNTI) for UE device 102, based on the timing of PRACH preamble 604. Thus, if two different UE devices 102 respond to broadcast message 602 at the same time, by each sending a PRACH preamble, wireless station 104 may generate the same RA-RNTI for both UE devices 102. This introduces the potential for a contention between the two UE devices 102. The potential contention is discussed below with reference to FIG. 9.

In addition to the RA-RNTI, wireless station 104 calculates Temporary Cell (TC)-RNTI and a value of a Timing Advance parameter. The parameter value is computed based on the transmission time of broadcast signal 602 and the time of receipt of PRACH preamble 604. Wireless station 104 then bundles the RA-RNTI, the TC-RNTI, the value of the Timing Advance parameter, and information needed by UE device 102 to send the next uplink message to wireless station 104. Wireless station 104 sends the bundled information as a Radio Access Response (RAR) message 606 on a Physical Downlink Shared Channel (PDSCH) to UE device 102.

Returning to FIG. 5A, process 500 includes UE device 102 receiving RAR message 606 from wireless station 104 (block 512). When UE device 102 receives RAR message 606, UE device 102 saves the TC-RNTI and makes a timing adjustment (block 514) in accordance with the value of the Timing Advance parameter. The timing adjustment $N_T$ is given by 16·(Timing Advance parameter)·$T_S$, where the value of the Timing Advance parameter can range from 0 to 1282.

Network $T_S$ is defined as 1/f/(DFT-size), where f is the subcarrier spacing and the DFT-size is the size of Discrete Fourier Transform in Orthogonal Frequency Division Multiplex (OFDM) transceivers. Accordingly, $T_S$ may depend on the particular radio technology and the frequency band involved in UE device communication. For example, for an LTE network, subcarrier spacing f may be 15 kHz and the DFT-size may be 2048. Thus, $T_S=1/(15000/2048) \approx 0.0325$ µs. In another example, for a particular 5G NR band, the DFT-size may be 4096, and the subcarrier spacing f may be 240 kHz. Thus, $T_S=1/(240000/4096) \approx 1.02$ nanoseconds. Other values of $T_S$ are possible, depending on the radio access technology.

Figure 8A:
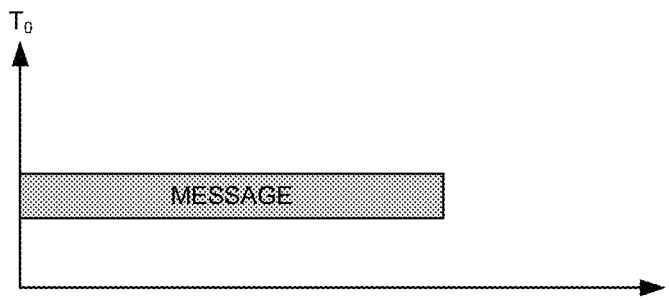
FIGS. 8A-8D illustrate an exemplary time delay associated with a transmitted message due to its traveling distance.
Figure 8B:
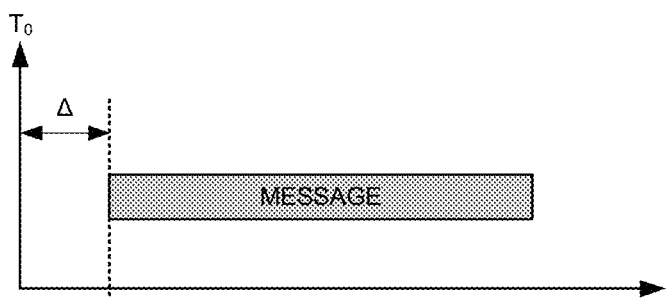
Figure 8C:
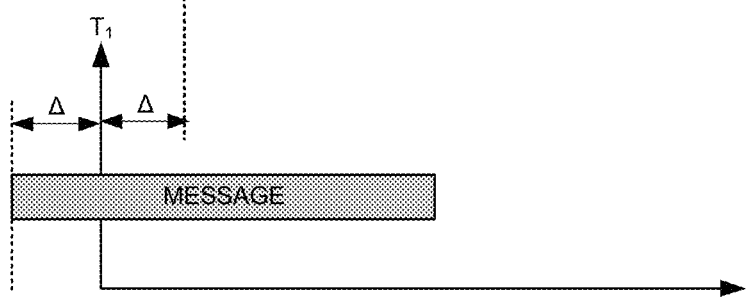
Figure 8D:
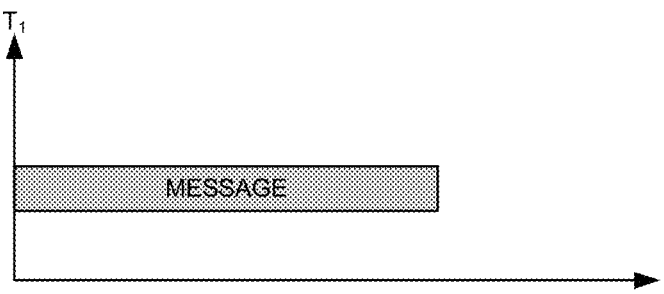

The value of timing adjustment $N_T$ is equal to twice the time delay Δ between the transmission time of a message at wireless station 104 and the time of its receipt at UE device 102. That is, $N_T=2\Delta$. FIGS. 8A-8D illustrate the time delay Δ. For FIGS. 8A and 8B, assume that a message (e.g., broadcast message 602) is transmitted from wireless station 104 at $T_0$ and received by UE device 102 at $T_0+\Delta$, where the time delay Δ is a travel time of the message over the distance between UE device 102 and wireless station 104. Assuming UE device 102 is temporarily synchronized to the received message (i.e., synchronized to $T_0+\Delta$), UE device 102 would schedule the transmission of its next message to wireless station 104 so that the next message is received by wireless station at time $T_1$. To do so, UE device 102 has to account for the time delay Δ of broadcast message 602 on its transit to UE device 102 and the same delay Δ of the next message on its transmit to wireless station 104. Accordingly, UE device 102 has to advance the transmission time of its next message by 2Δ, relative to the time of receipt. FIG. 8C illustrates advancing the transmission time of its message by $2\Delta=N_T$, such that, as shown in FIG. 8D, wireless station 104 receives the message at $T_1$.

Turning to FIG. 5B, process 500 includes UE device 102 storing the value of the Timing Advance parameter (block 516). UE device 102 then selects a random number as a temporary identifier, includes the temporary identifier in a RRC connection request 608 (block 518), and sends RRC connection request 608 on a Physical Uplink Shared Channel (PUSCH) to wireless station 104 (block 520).

When wireless station 104 receives RRC connection request 608, wireless station 104 extracts the random number included in RRC connection request 608 and includes the random number as a validation code in a RRC connection setup message 610 that wireless station 104 generates. Wireless station 104 then transmits RRC connection setup message 610 to UE device 102.

Process 500 further includes UE device 102 receiving RRC connection setup message 610 from wireless station 104 (block 522). UE device 102 compares the validation code included by wireless station 104 in RRC connection setup message 610 to the random number that UE device 102 sent in RRC connection request 608 (block 524).

If the validation code does not match the random number (block 524: NO), UE device 102 determines that RAR message 606 to which UE device 102 responded with RRC connection request 608 was not intended for UE device 102, discards the stored value of Timing Advance parameter, and terminates the current RACH procedure (block 526). UE device 102 then returns to block 504 of process 500 to restart the RACH procedure 603. If the validation code does match the random number (block 524: YES), logic 406 retains the Timing Advance parameter value (block 528).

In process 500, the reason for performing blocks 518-526 is to resolve any signaling contention that can arise from another UE device 102 engaged in a RACH procedure with wireless station 104. FIGS. 9A-9D illustrate an exemplary contention between two UE devices 102 and 902 attempting to attach to provider network 202 via wireless station 104.

Figure 9A:
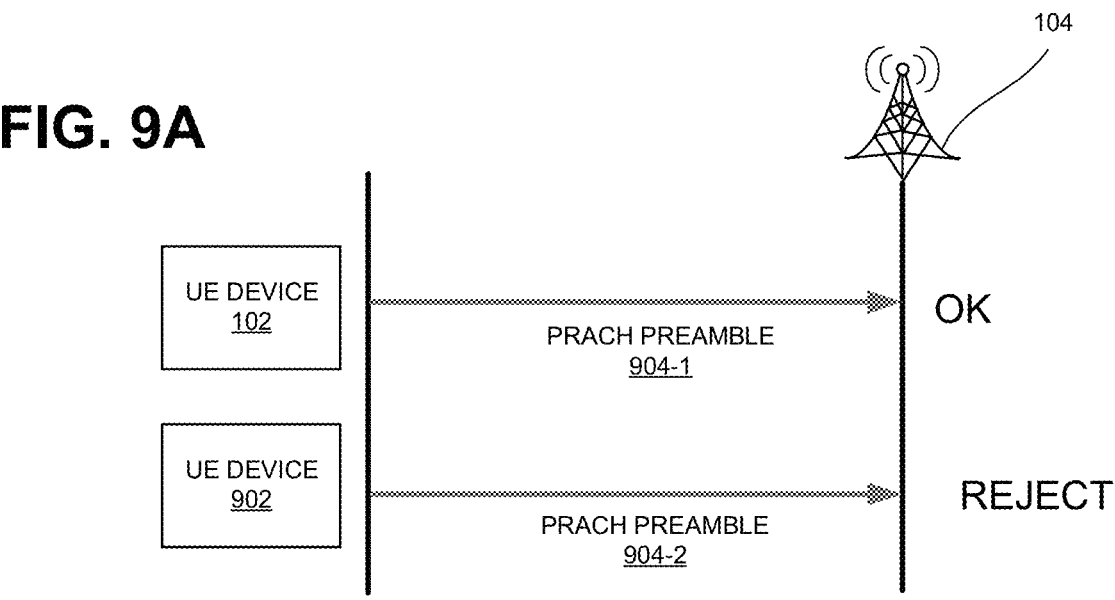
FIGS. 9A-9D illustrate an exemplary contention during a RACH procedure.
Figure 9B:
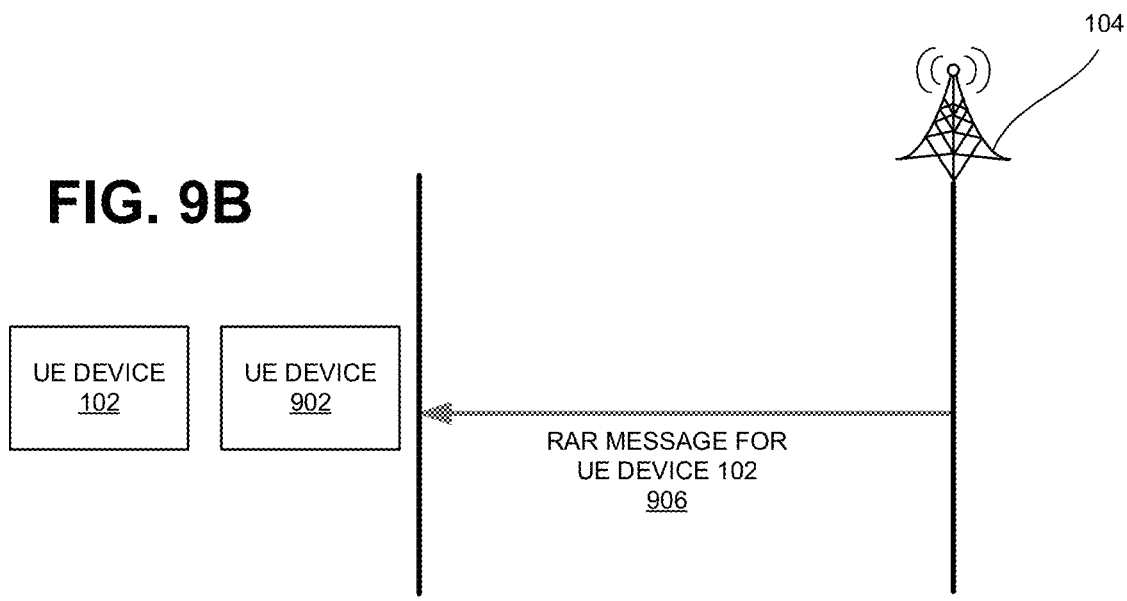

In FIG. 9A, after wireless station 104 sends a broadcast message, UE device 102 and UE device 902 respond with a PRACH preamble messages 904-1 and 904-2, respectively. Wireless station 104 accepts preamble 904-1 but rejects preamble 904-2. In FIG. 9B, wireless station 104 responds to preamble 904-1 by sending a RAR message 906 to UE device 102. Because RAR message 906 is intended for UE device 102, RAR message 906 includes a Timing Advance parameter value that pertains to UE device 102. Both UE device 102 and UE device 902, however, receive RAR message 906.

Figure 9C:
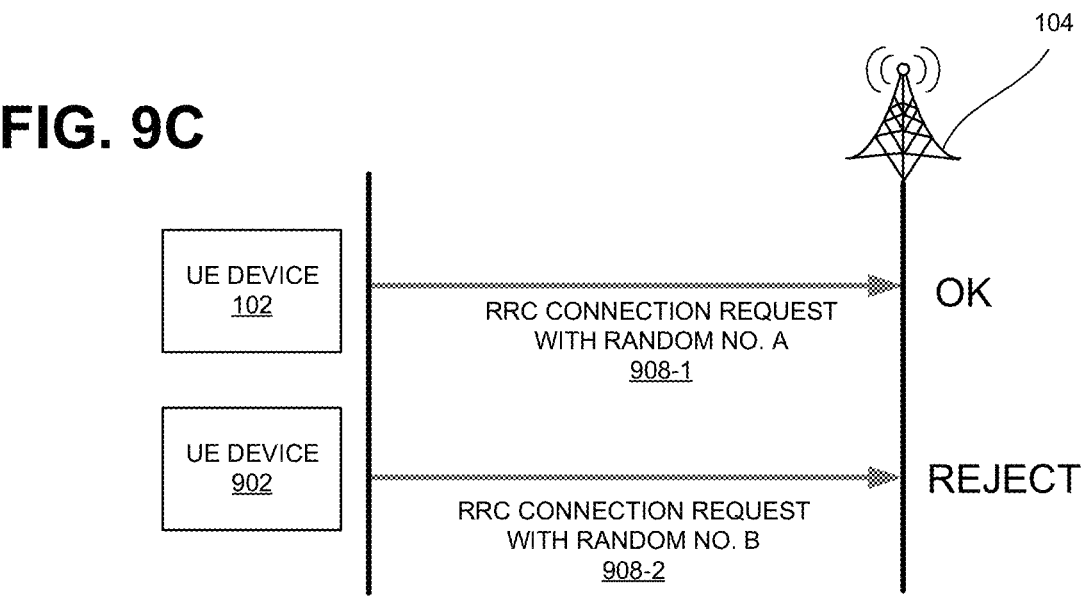

In FIG. 9C, UE device 102 responds to RAR message 906 with a RRC connection request 908-1, which includes a random number A selected by UE device 102. UE device 902 responds to RAR message 906 with a different RRC connection request 908-2, which includes a random number B selected by UE device 902. Wireless station 104, however, rejects RRC connection request 908-2, because it has been time adjusted in accordance with the Timing Advance parameter value that was provided in RAR message 906 for UE device 102.

Figure 9D:
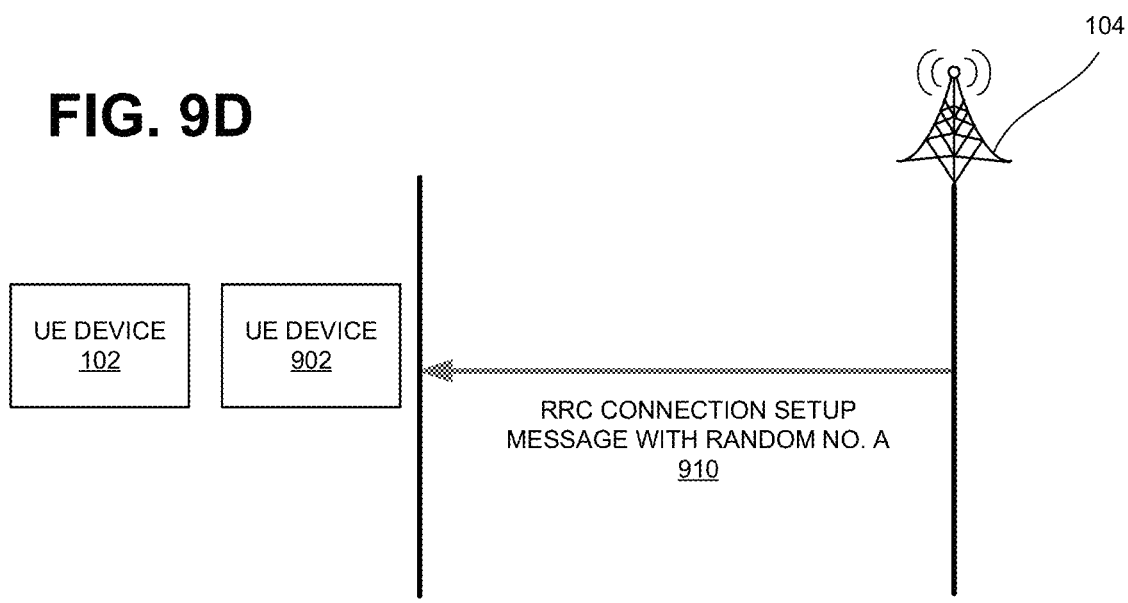

In FIG. 9D, wireless station 104 sends a RRC connection setup message 910 that includes the random number A as the validation code. Both UE devices 102 and 902 receive message 910. When UE device 102 examines the validation code provided in RRC connection setup message 910, by comparing it to the random number A, UE device 102 device confirms that wireless station 104 has been corresponding with UE device 102. UE device 902 determines that wireless station 104 has not been corresponding with UE device 902 but with UE device 102, because the validation code does not match the random number B. UE device 902 may abandon the current RACH procedure and start a new RACH procedure with wireless station 104.

In some embodiments, UE device 102 may have the capability to avoid performing blocks 518-526 to check for contention. More specifically, instead of performing all actions that are associated with RACH procedure 603, UE device 102 may abort from RACH procedure 603 just after block 516 (e.g., after UE device 102 receives RAR message 606 from wireless station 104 and obtains the value of the Timing Advance parameter). By terminating RACH procedure 603 just after block 516, UE device 102 may avoid burdening wireless station 104 with processing RRC connection request 608 and sending RRC connection response message 610. This capability may be especially impactful in alleviating wireless stations 104 load in wireless-station dense areas, because such areas typically have greatest traffic.

When UE device 102 does not complete full RACH procedure 603, the value of the Timing Advance parameter that UE device 102 obtains may be incorrect. Wireless station 104 may have intended the Timing Advance parameter value for a different UE device 102. However, whether UE device 102 further verifies the value by using other measurements (e.g., measurements from additional wireless stations 104, values from its GPS receivers, etc.) or using another method may be implementation dependent.

Turning to FIG. 5C, UE device 102 may determine whether there is a next wireless station 104 for which UE device 102 is to determine the value of the Timing Advance parameter (block 530). If so (block 530: YES), UE device 102 may proceed to block 504 to repeat the process 500 (except block 502) for the next wireless station 104. Otherwise (block 530: NO), UE device 102 may use the values of the Timing Advance parameters to perform multilateration of the location of UE device 102 (block 532).

In performing the multilateration, UE device 102 calculates, for each of the Timing Advance parameter values, the distance between UE device 102 and the corresponding wireless station 104 (block 532).

If D denotes the distance between UE device 102 and a particular wireless station 104, $D=N_T\cdot(\text{Speed of Light})/2$. For example, if the value of Timing Advance parameter is 1, then:

$$N_T = 16 \cdot (\text{Timing Advance parameter}) \cdot T_S$$
$$= 16 \cdot T_S$$

For example, for an LTE network, $N_T \cdot T_S = 0.521$ μs and $D=[(0.52\ \mu s)\cdot 3\times 10^8\ m/s]/2 \approx 78$ m. In another example, for a 5G NR network, $N_T = 16\ T_S \approx 16$ nanoseconds, and $D=(N_T\cdot 3\times 10^8\ m/s)/2 = 8\times 10^{-9}\ s\cdot 3\times 10^8\ m/s = 2.4$ m.

The multilateration further include UE device 102 using the calculated distances to locate UE device 102. For example, assume that a particular $S_i$ denotes a particular wireless station 104 (i=1, 2, 3 . . . ), and the distance between the wireless station $S_i$ and UE device 102 has been determined as $R_i$. If coordinates (x, y, z) denotes the unknown location of UE device 102 and $(x_i, y_i, z_i)$ denotes the known location of wireless station 104 $S_i$, it is possible to write:

$$(x-x_i)^2+(y-y_i)^2-(z-yz_i)^2=R_i^2 \quad (1).$$

If there are three wireless stations $S_i$, each for i=1, 2, and 3, then, expression (1) leads to:

$$(x-x_1)^2+(y-y_1)^2+(z-yz_1)^2=R_1^2 \quad (2)$$

$$(x-x_2)^2+(y-y_2)^2+(z-yz_2)^2=R_2^2 \quad (3)$$

$$(x-x_3)^2+(y-y_3)^2+(z-yz_3)^2=R_3^2 \quad (4)$$

Figure 10:
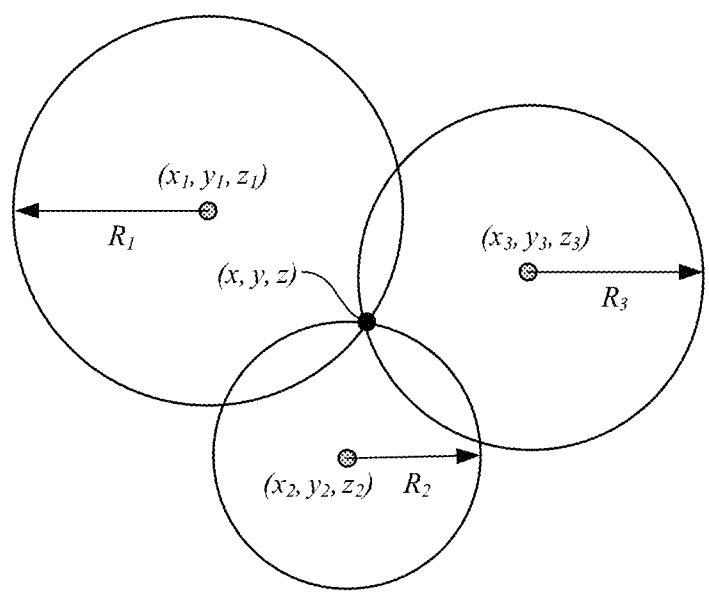
FIG. 10 illustrates exemplary spheres.

Each of expressions (2)-(4) is an algebraic equation that describes a three-dimensional sphere in XYZ coordinates. FIG. 10 illustrates exemplary spheres corresponding to expressions (2)-(4). As shown, the values of x, y, and z that satisfy all expressions (2)-(4) occur at the intersection of the three spheres, and are the simultaneous solution of expressions (2)-(4).

Each of expressions (2)-(4) includes quadratic terms of x, y, and z. These quadratic terms in expressions (2)-(4) are identical. This suggests eliminating the quadratic terms to derive linear expressions of x, y, and z, by subtracting one of expressions (2)-(4) from another one of expressions (2)-(4). Accordingly, subtracting expression (3) from (2) and collecting terms yield:

$$2x(x_2-x_1)+x_1^2-x_2^2+2y(y_2-y_1)+y_1^2-y_2^2+2z(z_2-z_1)+z_1^2-z_2^2=R_1^2-R_2^2 \quad (5)$$

Subtracting expression (4) from (3) and collecting terms yield:

$$2x(x_3-x_2)+x_2^2-x_3^2+2y(y_3-y_2)+y_2^2-y_3^2+2z(z_3-z_2)+z_2^2-z_3^2=R_2^2-R_3^2 \quad (6)$$

Subtracting expression (4) from (2) and collecting terms yield:

$$2x(x_3-x_1)+x_1^2-x_3^2+2y(y_3-y_1)+y_1^2y_3^2+2z(z_3-z_1)+z_1^2-z_3^2=R_1^2-R_3^2 \quad (7).$$

Coordinates $(x_i, y_i, z_i)$ for wireless stations $S_i$ (i=1, 2, and 3) correspond to the locations of wireless stations 104. HIP-coordinates logic 406 can obtain the values of these coordinates from wireless station location database 404, as discussed above. Also as discussed above, $R_i$s are calculated from the values of the Timing Advance parameter. Thus, the only unknown values in expressions (5)-(7) are those of x, y, and z. Accordingly, expressions (5)-(7) are three linear equations of three unknown variables, x, y, and z. These equations can be solved by applying one of many methods for solving a system of linear equations (e.g., Gaussian elimination, Cramer's Rule, Cholesky Decomposition, Gauss-Jordan Elimination, Gauss-Seidel iterative method, etc.).

In a different embodiment, UE device 102 may obtain more than three values of the Timing Advance parameter, each from a different wireless station 104 (i.e., there are more than three wireless stations 104 for UE device 102 to perform multilateration). In this embodiment, performing the algebraic manipulations discussed above leads to more than three linear equations. Since there are only three unknown variables, the equations are over-determined. Accordingly, the least-squares solution can be obtained for x, y, and z, where the accuracy of x, y, and z depends on the number of measurements (i.e., the number of wireless stations 104). Increasing the number of values of the Timing Advance parameter increases the accuracy of the HIP coordinates (x, y, z) obtained as the least-squares solution.

In a different embodiment, instead of UE device 102 performing block 532, UE device 102 may send the values of the Timing Advance parameter and its corresponding abbreviated PCIs to location service platform 106, which may be stationed in provider network 202. Location service platform 106 may perform the multilateration based on the values of Timing Advance parameter and the PCIs, and provide the HIP coordinates of UE device 102 to subscribers. Location service platform 106 may include its own wireless station location database, similar to database 404 described for UE device 102.

In another embodiment, instead of performing block 502, UE device 102 may proceed directly to block 504 to initiate RACH procedure 603. UE device 102 may count the number of wireless stations 104 with which UE device 102 it has performed RACH procedure 603 based on detecting different PCIs. If UE device 102 is unable to perform sufficient number of RACH procedures 603 with different wireless stations 104, UE device 102 may indicate (to a user or to another device) that it is unable to obtain its HIP coordinates.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 5A-5C, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, block, or instruction used in the present application should be construed as essential to the implementations described herein unless explicitly described as such. As used herein, the articles "a," "an," and "the" are intended to include one or more items. The phrase "based on" is intended to mean "based, at least in part, on" unless explicitly stated otherwise.

What is claimed is:

1. A device comprising:
   an interface to communicate with wireless stations in a network; and
   a processor configured to:
   perform a partial Random Access Chanel (RACH) procedure for each wireless station of a plurality of wireless stations, wherein the partial RACH procedure for each wireless station of the plurality of wireless stations includes:
   starting a RACH procedure;
   selecting and transmitting a Physical Random Access Channel (PRACH) preamble to the wireless station;
   receiving a Random Access Response (RAR) message from the wireless station;
   extracting a parameter value from the RAR message;
   storing the extracted parameter value; and
   terminating the RACH procedure before completing the RACH procedure, wherein the device includes a User Equipment (UE) device.

2. The device of claim 1, wherein the extracted parameter value includes:
   a value of a Timing Advance parameter in the RAR message.

3. The device of claim 1, wherein the processor is further configured to:
   determine a location of the device based on the extracted parameter values from performing, for each of the plurality of wireless stations, the partial RACH procedure.

4. The device of claim 3, wherein when the processor determines the location, the processor is configured to:
   apply multilateration based on the extracted parameter values.

5. The device of claim 4, wherein when the processor applies multilateration, the processor is configured to:
   determine a distance from the device to each of the plurality of wireless stations.

6. The device of claim 1, wherein starting the RACH procedure includes:
   detecting a broadcast signal from the wireless station.

7. The device of claim 1, further comprising:
   verifying the extracted parameter value by using measurements from other wireless stations.

8. A method comprising:
   performing, by a User Equipment (UE) device, a partial Random Access Chanel (RACH) procedure for at least one wireless station of a plurality of wireless stations, wherein the partial RACH procedure includes:
   starting a RACH procedure;
   selecting and transmitting a Physical Random Access Channel (PRACH) preamble to the wireless station;
   receiving a Random Access Response (RAR) message from the wireless station;
   extracting a parameter value from the RAR message;
   storing the extracted parameter value; and
   terminating the RACH procedure before completing the RACH procedure.

9. The method of claim 8, wherein the extracted parameter value includes:
   a value of a Timing Advance parameter in the RAR message.

10. The method of claim 8, further comprising:
    determining a location of the device based on the extracted parameter value and other values obtained from performing, for other wireless stations of the plurality of wireless stations, the partial RACH procedure.

11. The method of claim 10, wherein determining the location comprises:
   applying multilateration based on the extracted parameter values.

12. The method of claim 11, wherein applying multilateration includes:
   determining a distance from the device to each of the plurality of wireless stations.

13. The method of claim 8, wherein starting the RACH procedure includes:
   detecting a broadcast signal from the wireless station.

14. The method of claim 8, further comprising:
   verifying the extracted parameter value by using measurements from other wireless stations.

15. A non-transitory computer-readable medium, including processor-executable instructions that, when executed by a processor included in a User Equipment (UE) device, cause the processor to:
   perform a partial Random Access Chanel (RACH) procedure for at least one wireless station of a plurality of wireless stations, wherein the partial RACH procedure includes:
      starting a RACH procedure;
      selecting and transmitting a Physical Random Access Channel (PRACH) preamble to the wireless station;
      receiving a Random Access Response (RAR) message from the wireless station;
      extracting a parameter value from the RAR message;
      storing the extracted parameter value; and
      terminating the RACH procedure before completing the RACH procedure.

16. The non-transitory computer-readable medium of claim 15, wherein the extracted parameter value includes:
   a value of a Timing Advance parameter in the RAR message.

17. The non-transitory computer-readable medium of claim 15, wherein the processor is further to:
   determine a location of the device based on the extracted parameter value and other values obtained from performing, for other wireless stations of the plurality of wireless stations, the partial RACH procedure.

18. The non-transitory computer-readable medium of claim 17, wherein when the processor determines the location, the processor is to:
   apply multilateration based on the extracted parameter values.

19. The non-transitory computer-readable medium of claim 18, wherein when the processor applies multilateration, the processor is to:
   determine a distance from the device to each of the plurality of wireless stations.

20. The non-transitory computer-readable medium of claim 15, wherein starting the RACH procedure includes:
   detecting a broadcast signal from the wireless station.

* * * * *